United States Patent [19]

Taylor et al.

[11] 3,996,034

[45] Dec. 7, 1976

[54] GLASS MANUFACTURING APPARATUS AND PROCESS

[75] Inventors: Charles Ronald Taylor, St. Helens; Edward Albert Buckley, Rainhill, both of England

[73] Assignee: Pilkington Brothers Limited, St. Helens, England

[22] Filed: July 30, 1975

[21] Appl. No.: 600,526

[30] Foreign Application Priority Data

Aug. 8, 1974 United Kingdom ............ 35075/74

[52] U.S. Cl. .............................. 65/60 C; 65/99 A; 65/182 R; 65/374 RM; 204/290 R
[51] Int. Cl.² ......................................... C03C 21/00
[58] Field of Search ............... 65/99 A, 182 R, 374, 65/30 E, 60 C; 427/12; 204/290 R

[56] References Cited

UNITED STATES PATENTS

| | | | |
|---|---|---|---|
| 3,133,872 | 5/1964 | Miller et al. | 204/290 R X |
| 3,243,365 | 3/1966 | Aikin | 204/290 R |
| 3,656,926 | 4/1972 | Loukes et al. | 65/182 R X |
| 3,785,949 | 1/1974 | Matthey | 204/290 R X |
| 3,876,406 | 4/1975 | Lawrenson et al. | 65/99 A X |

*Primary Examiner*—Robert L. Lindsay, Jr.
*Attorney, Agent, or Firm*—Burns, Doane, Swecker & Mathis

[57] ABSTRACT

An elongated locating member is employed to locate a molten body for treating a glass ribbon in contact with a surface of the ribbon. A wettable surface region of the locating member to which the molten body clings is demarcated by a surface layer of a material which is not wetted by the molten body.

28 Claims, 9 Drawing Figures

GLASS MANUFACTURING APPARATUS AND PROCESS

BACKGROUND OF THE INVENTION

1. Field of the Invention

This invention relates to a glass manufacturing apparatus and process and more especially to an apparatus and process in which an elongated locating member is employed for locating a molten metal body on the upper surface of an advancing ribbon of glass.

This apparatus and process are employed to impart predetermined characteristics to the upper surface of the ribbon of glass, usually, but not necessarily, float glass, by migration of an element or elements into the glass from a body of molten material which is held in contact with the upper surface of the advancing ribbon of glass by the molten body clinging to the underface of the locating member.

2. Description of the Prior Art

The migration of the element or elements into the glass from the molten body, which may be a molten metal or a molten alloy, is controlled for example by regulating the oxidising conditions at the interface between the glass and the body. More usually an electrolytic method is used in which the locating member acts as an electrode and is for example connected as an anode so that current is passed from the molten body through the glass, which is electrically conductive at the temperatures of operation in the float glass manufacture, to effect controlled migration of ions of an element or elements from the molten body into the upper surface of the glass.

It is found in practice that erosion of the undersurface of the locating member takes place, especially if the material of the locating member dissolves electrolytically in the molten body. Electrolytic solution of the locating member in the molten body may serve to replenish the motlen body. Unfortunately, the erosion may also lead to uneven treatment of the glass. The front and rear faces of the lower part of the locating member, that is the upstream and downstream faces, considered with reference to the direction of advance of the ribbon of glass, especially the downstream rear face, are particularly susceptible to erosion and the erosion of the front and rear edges of the under-surface of the locating member causes the dimension of the molten body in the direction of advance of the glass to contract. This erosion, and hence the contraction, tends to vary across the width of the glass leading to uneven treatment of the glass. To maintain uniform treatment the locating member is replaced with consequent loss of production time and treated product.

It has been proposed to obviate this wear and maintain constant the length of the molten body considered in the direction of advance of the ribbon of glass for longer operating periods, by providing that at least the downstream edge of the locating member is formed of a material which is more resistant to wear by the molten body than the remainder of the locating member. This downstream edge portion of the locating member has taken the form of an insert keyed into the locating member.

It is a main object of the present invention to provide a different way of alleviating the problem of wear of the under face of the locating member by a control of the length of the molten body considered in the direction of advance of the ribbon to maintain that length uniform recognising that erosion of the underface of the locating member occurs and tends to be greatest at the upstream and downstream edges of the locating member.

SUMMARY

This object is achieved according to the invention by providing, in glass manufacturing apparatus of the kind in which a locating member locates a molten body in contact with a surface of an advancing ribbon of glass, a locating member which has a surface region which is wettable by the molten body and a surface layer of a material which is not wetted by the molten body. The non-wetted surface layer demarcates the extent and configuration of the wettable surface region.

The invention is applicable particularly to the surface treatment of float glass during manufacture in which the locating member extends across the tank structure containing a molten metal bath and the wettable surface region is all or part of the lower face of the locating member, the non-wetted surface layer being provided on one or both of the longer upright side faces of the locating member.

The non-wetted surface layer may also be employed for shaping of the wettable surface region to a desired shape corresponding to a pattern to be imparted to the glass by ionic migration from the molten body. Further the non-wetted surface layer may be employed to improve the definition of the shape of a molten body which is clinging to a locating member which is itself shaped to a desired configuration, for example including at least one re-entrant portion.

The invention also provides a glass manufacturing process in which a molten body which is to treat a surface of an advancing ribbon of glass, clings to a wettable region of an elongated locating member position adjacent to that ribbon surface; the process including the step of at least partially demarcating the configuration of the wettable region of the locating member by means of a surface layer of material which is not wetted by the molten body.

Further the invention provides an elongated locating member for locating a molten body on a surface of an advancing ribbon of glass. The locating member has a surface region which is wettable by the molten body and to which the molten body clings in use, and a surface layer of a material which is not wetted by the molten body demarcates the configuration of the wettable surface region.

BRIEF DESCRIPTION OF THE DRAWINGS

Some embodiments of the invention will now be described, by way of example, with reference to the accompanying drawings in which.

DESCRIPTION OF THE PREFERRED EMBODIMENTS

Figure 1:
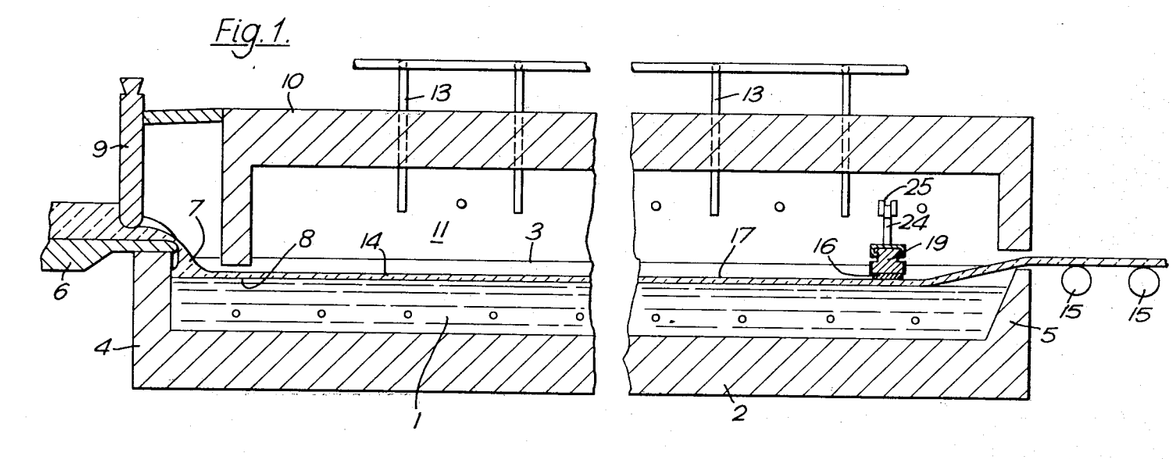
FIG. 1 is a vertical section through float glass manufacturing apparatus showing a locating member according to the invention and a molten body clinging to the locating member and thereby located on the upper surface of the advancing float glass ribbon.
Figure 2:
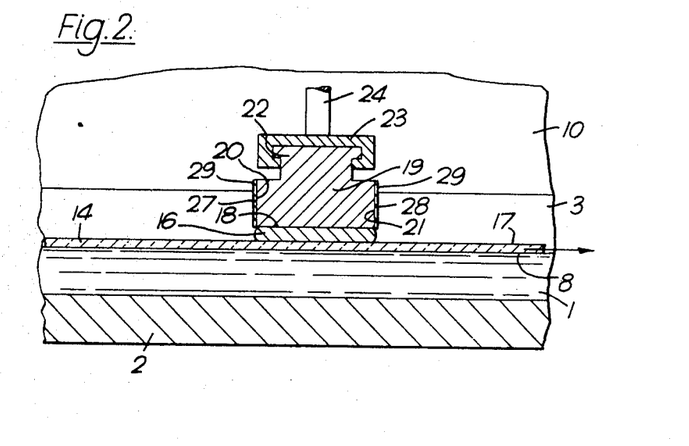
FIG. 2 is a detailed cross-sectional view through the locating member of FIG. 1.
Figure 3:
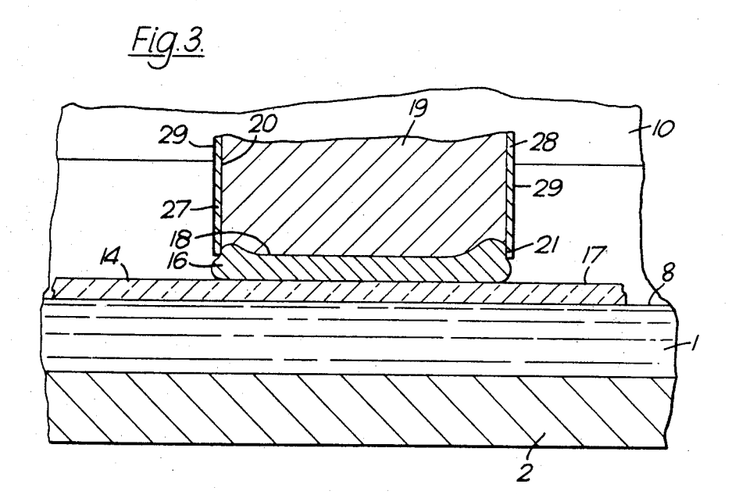
FIG. 3 is a view similar to FIG. 1 illustrating the way in which the underface of the locating member becomes worn.

Referring to FIGS. 1 to 3 of the drawings a molten metal bath 1, for example of tin or a tin alloy in which tin predominates, is contained in an elongated tank structure having a floor 2, side walls 3, and end walls 4 and 5 respectively at the inlet and outlet ends of the tank structure. The spout 6 extends over the inlet end wall 4 and pours molten glass 7 onto the surface 8 of the molten metal bath under control of a regulating tweel 9. A roof structure 10 is mounted over the tank structure to define a head space 11 over the bath into which protective atmosphere for example 95% nitrogen and 5% hydrogen is fed through ducts 13. The protective atmosphere is maintained at a plenum in the head space 11.

A ribbon of glass 14 is formed from the molten glass 7 poured on to the bath, in well known manner, and the ribbon is advanced along the bath surface 8 by traction applied to the ultimate ribbon discharged from the outlet end of the tank structure by means of traction rollers 15. The ribbon is cooled as it is advanced along the bath until it is sufficiently stiffened to be taken unharmed from the bath and near the outlet end of the tank structure a body of molten material 16 is maintained in contact with the upper surface 17 of the ribbon. The molten body 16 is usually molten metal or a molten alloy for modifying the upper surface 17 of the ribbon of glass. The molten body 16 does not wet the surface of the glass and is located in position by clinging to the wettable underface 18 of an elongated locating member 19 whose transverse cross-section, as shown, is of rectangular form as defined by the lower face 18 and upright side faces 20 and 21. When the locating member is positioned across the tank structure with the lower face 18 just above the path of travel of the upper surface 17 of the ribbon of glass, the upright side face 20 is the upstream face and the upright side face 21 is the downstream face.

The locating member 19 has a head 22 which is held in a shoe 23 which is suspended by hangers 24 which are fixed to a water cooled beam 25 which extends across the bath and is supported on pedestals on either side of the tank structure.

By means of the hangers, the location of the locating member can be adjusted and usually a gap of uniform depth, for example 3 mm to 4 mm is maintained between the lower face 18 of the locating member and the upper surface 17 of the glass.

In one embodiment, in which the solar heat rejection characteristics of the glass are modified by migration of copper and lead ions into the upper surface 17 of the ribbon of glass, for subsequent reduction in that surface, the molten body 16 is a body of copper/lead alloy and the locating member 19 is an elongated copper bar. The lower copper face 18 of the bar is wetted by the alloy and electrical connection is made to the copper bar 19 from an electrical supply source, not shown, in such a way that the locating member 19 is an anode. The other side of the electrical supply source is connected to an electrode 26 which dips into the molten metal bath 1 near to the position of the locating member 19. Current flows from the locating member 19 through the molten body 16 and the thickness of the ribbon of glass 14 into the molten metal bath 1. Copper and lead ions migrate from the molten body 16 into the ribbon surface 17. Th copper in the molten alloy body 16 is replenished by solution of copper from the lower face 18 of the locating member. Lead in the molten alloy body 16 may be replenished either through a small aperture, not shown, in the locating member 19, or by feeding lead pellets onto the surface of the glass ribbon upstream of the locating member for melting on the ribbon surface and eventual incorporation into the molten body 16.

Wear of the underface of the locating member 19 has been observed particularly at the upstream and downstream edges of the locating member and in order to control the configuration of the molten body 16, despite such wear at the upstream and downstream edges as is indicated in FIG. 3, the configuration of the surface region of the locating member which is wetted by the molten body 16 is demarcated, at least partially, and wholly in the embodiment described, by surface layers of a material which is not wetted by the molten body 18. These non-wetted layers comprise coatings 27 and 28 of chromium which are provided on the longer upright side faces 20 and 21 of the locating member. The chromium coatings are preferably plated onto the side faces 20 and 21 and the thickness of the coatings is exaggerated in the drawings for clarity. Whilst the coatings are shown extending up the full height of the longer upright side faces of the locating member, it will be appreciated that there is no necessity for the coatings to extend to the top of those upright faces.

The chromium plated upright side faces of the bar, in the course of transport to location in the apparatus and subsequent heating when positioned in the apparatus in the presence of such traces of oxygen and water vapour as are known to exist in the atmosphere in the head space 11 over the bath, acquire chromium oxide surfaces, indicated at 29 which surfaces are not wetted by the molten body 16 of copper/lead alloy.

The chromium coating is a coherent coating which therefore presents an outer surface which in non-wetted by the molten metal body and it has been found that when wear or erosion of the wetted lower face 18 of the locating member has taken place to the form illustrated in FIG. 3, there is still sufficient adhesion of solid copper to the inner faces of the coherent chromium coatings 29 to ensure that the inner faces of the coatings are wetted by the molten body of copper/lead alloy. This means that the configuration of the molten body 16 is maintained and despite wear of the underface 18 of the locating member, the surface region of the locating member wettable by the molten body 16 is still demarcated by the chromium plated coatings 27 and 28.

Figure 4:
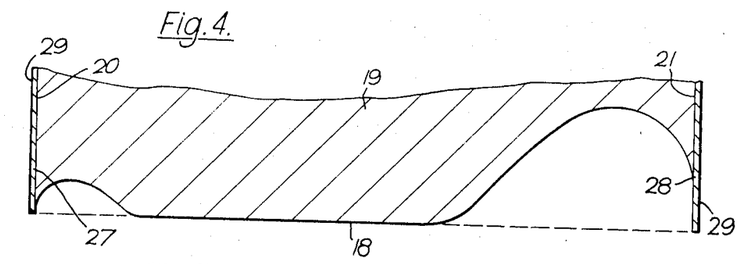
FIG. 4 shows diagrammatically the state of the underface of the locating member when it has become worn.

This is illustrated more clearly in FIG. 4 which illustrates the cross-sectional shape of a locating member according to the invention after 16 hours use. Considerable wear has taken place in the region of the downstream edge of the locating member but the coherent chromium coating 28 is intact and the molten body 16 wets onto the inner face of that coating which thereby controls the configuration of the molten body despite the wear, since wetting of the locating member by the molten body is only within the bounds determined by the non-wetted exposed surfaces 29 of the chromium coatings which are presented externally of the locating member.

Figure 5:
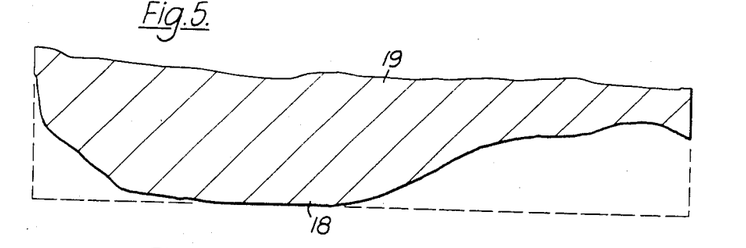
FIG. 5 illustrates for comparison the state of a locating member without the protection of a non-wetted surface layer according to the invention, after an identical period of use.

For the sake of comparison FIG. 5 illustrates the shape of an unprotected locating member after 16 hours use. There is no possibility of the configuration of the molten body 16 being maintained since the molten body would creep upstream in order to maintain its wetting contact with the eroded lower face 18 of the locating member.

The chromium coatings 27 and 28 may be provided by methods other than electro-plating for example by plasma-spraying. Alternatively a chromium oxide coating may be applied by a spray process without the intermediate formation of the chromium coating.

Coatings of other materials which are not wetted by the molten body 16 may be used under the operational conditions of the float process that is where the temperature is in the range 600° to 950° C. The wettability of a particular coating, if in doubt, can readily be ascertained by simple trial. Coating materials which may be used include metal oxides, metal carbides and metal borides, for example chromium carbide, chromium boride, aluminium oxide or zirconium boride. All of these are inert refractory materials. Such materials would be applied by spray coating to build up a thicker film which would compensate for the more granular form of these materials.

The thickness of the non-wetted surface layers is not critical. For example an extremely thin film can provide an improved life whilst there is no theoretical maximum to the thickness of the layer which may be used.

Usually when employing chromium-plated surface layers, such as the layers 27 and 28, the thickness of the layers may be from 0.001 mm to 0.100 mm, preferably from 0.0125 mm to 0.05 mm. Chromium coatings of thickness in the preferred range have been found in practice to retain their form as indicated in FIG. 4 for an extended period, for example 24 hours or even up to 48 hours. In time there is some loss from the bottom edge of the chromium coating particularly from the downstream coating 28. This gives a great improvement in the life of the locating member, acting as an anode, since in the past an unprotected locating member had to be replaced after about 8 hours use, by which time faults in the surface treatment of the glass become evident caused by erosion of the downstream edge of the locating member.

While the erosion of the downstream edge is most troublesome there is also erosion of the upstream edge and FIG. 4 also shows how the chromium coating 27 on the upstream side face 20 of the locating member preserves the location of the upstream limit of the molten body.

Locating members according to the present invention thus have a longer life than those previously employed and because the frequency with which locating members have to be replaced is greatly reduced, there is considerable advantage since the length of ribbon of glass produced during the time taken to change over the locating member is untreated ribbon.

The locating member 19 may be of an unreactive metal for example one of the platinum group metals or, as well as copper, may be of silver, brass, bronze, steel, or alloys of copper or silver.

Molten metals which may be employed to constitute the molten body 16 are tin, lead, bismuth, antimony, indium, zinc, or thallium.

Molten alloys which may be employed for the molten body 16 are alloys of tin or lead or bismuth as solvent metal with lithium, sodium, potassium, zinc, magnesium, copper or silver. The invention has been effectively employed using a tungsten locating member with chromium-plated coatings on its upright side faces and a molten body of a bismuth alloy wetting on to the tungsten bar.

No matter what materials are employed both for the locating member 19 and for the molten body 16, improvement in life is achieved even if only the downstream upright side face 21 of the bar is provided with its non-wetted coating 28. More usually however both of the longer upright side faces 20 and 21 are provided with non-wetted surface layers 27 and 28 as described.

Figure 6:
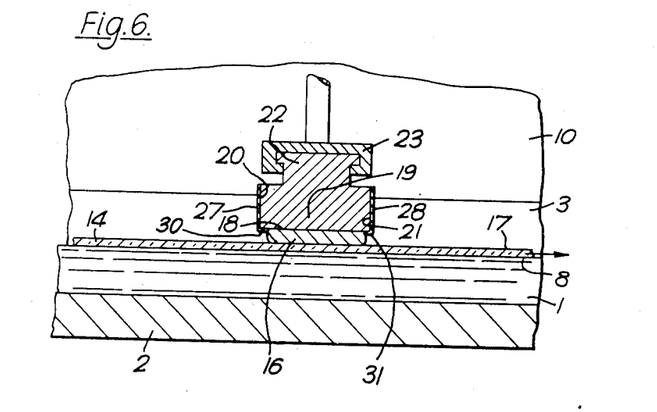
FIG. 6 is a view similar to FIG. 2 showing another embodiment of locating member according to the invention.

FIG. 6 illustrates a modified form of the locating member of FIGS. 2 to 4 in which the locating member 19 is provided with non-wetted surface coatings 27 and 28 which cover not only the upright side faces 20 and 21 of the member 19 and extend to the edges of the wettable lower face, but also extend around both those longer edges of the flat lower face 18 and just on to the flat face as indicated at 30 and 31. A centrally-disposed surface region of the lower face 18, which is wettable by the molten body 16 is thus demarcated upstream and downstream by the non-wetted parts 30 and 31 of the surface layers 27 and 28. When only the downstream upright side face 21 of the locating member is provided with a non-wetted surface layer that surface layer may also extend around the downstream edge of the locating member and just on to the downstream part of the lower face 18 of the locating member.

These extensions 30 and 31 of the non-wetted surface layers alleviate erosion of the locating member behind the coatings 27 and 28 on the upright side faces and help to prevent collapse of the lower part of the coated upright side faces 20 and 21 of the locating member.

Figure 7:
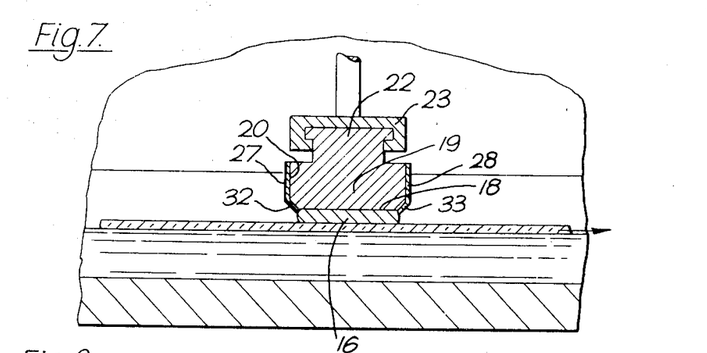
FIG. 7 is a view similar to FIG. 2 showing yet another modification of the locating member.

Another modification is shown in FIG. 7 in which the upstream and downstream edges of the locating member where the lower flat face 18 meets the upright side faces 20 and 21, are bevelled. The bevels are indicated at 32 and 33 and the non-wetted surface layers 27 and 28 extend over the faces of the bevels 32 and 33. This also helps to prevent collapse of the edges of the locating member as erosiion takes place. As before, when only the downstream upright side face 21 carries a non-wetted coating 28, then only the coated bevel 33 of the downstream edge may be present. In some applications it may be advantageous to provide the non-wetted surface layer on the upstream side face only of the locating member and in such instances only the non-wetted surface layer 27 is present.

It has been found that the use of non-wetted surface layers on the locating member to alleviate the problem of erosion of the lower face 18 of the locating member, is simpler and more convenient than techniques previously proposed for example the use of wear-resistent inserts.

As well as application to a simple locating member as illustrated in FIGS. 1 to 7, in the form of an elongated bar of rectangular transverse cross-section, which is normally used to apply a uniform coating to the upper surface of a ribbon of glass by ionic migration from the molten body 16 into the glass surface 17, the invention may also be applied to locating members which are shaped to the configuration of a pattern element to be introduced into the glass by switching of the electric current supply connected to the locating member. In such applications the coating may serve not only to alleviate erosion of the edge or edges of the locating member, but also to improve the definition of the configuration of the molten body clinging to the shaped underface of the locating member, by inhibiting flooding of re-entrant portions within the pattern shape of the locating member.

Figure 8:
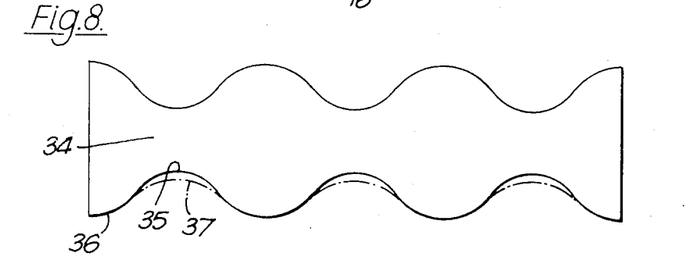
FIG. 8 illustrates the underface of a locating member which is itself shaped to a desired configuration with re-entrant portions.

FIG. 8 illustrates a locating member in the form of a shaped mild steel bar 34 which includes re-entrant portions 35. The downstream face of the locating member has a chromium coating indicated at 36 which presents a non-wetted chromium oxide surface. The molten body 16 is a body of molten indium which clings to the shaped underface of the locating member and conforms closely to the configuration of that underface. The provision of the non-wetted coating 15 has been found to enhance the conformity of the shape of the molten body 16 to that of the underface of the locating member 34 by avoiding a tendency of the molten indium to flood the re-entrant portions 35 of the locating member 34 as indicated by the dotted line 37.

Figure 9:
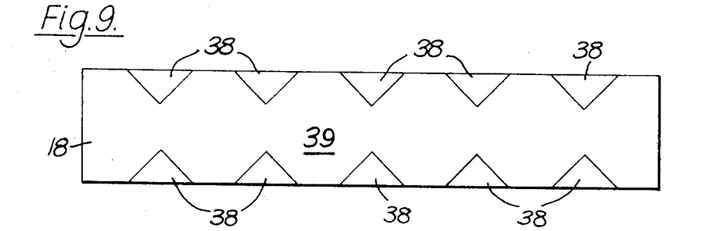
FIG. 9 illustrates the underface of a locating member with a shaped non-wetted layer demarcating a wetted region of desired configuration for use in imparting pattern elements to the glass surface.

Further a pattern may be demarcated on the flat lower face of a simple locating member 19 of rectangular transverse cross-section by applying a specially shaped non-wetted surface layer to the lower face of the locating member. The configuration of the molten body 16 is determined by the configuration of the surface region of the underface 16 of the locating member which is wettable by the molten body and this wettable surface region is demarcated by the coating which is applied selectively to the surface of the locating member. FIG. 9 shows the underface 18 of a locating member of wettable material, for example a copper bar for use with a molten body of copper/lead alloy. A pattern-defining non-wetted surface layer is applied to the underface, in addition to the non-wettable surface layers on the upright side faces of the locating member, is constituted by a number of coated areas 38 of triangular form regularly spaced along both sides of the lower face. The coated areas 38 together demarcate a wetted surface region 39 of desired configuration in this case a row of side-by-side octagons. The molten body clinging to this underface would therefore have the configuration of the row of side-by-side octagons and suitable switching of the electric current supply would result in the surface of the glass being modified by the production of pattern elements in the glass surface derived from the shape of the molten body.

An elongated locating member according to the invention can be employed for locating a molten body against a surface of a glass ribbon to be treated by that molten body in processes other than the float process, for example for treating a surface of a rolled ribbon of glass or a ribbon of vertically-drawn sheet glass. In such applications means are provided defining a path of travel for the glass ribbon, usually a conveyor for the glass with traction for advancing the glass ribbon along that path and an elongated locating member having a wettable surface region of configuration at least partially demarcated by a surface layer of a material which is not wetted by the molten body, is mounted adjacent the path of travel of the glass ribbon for locating a molten body on a surface of the glass ribbon.

We claim:
1. Glass manufacturing apparatus of the kind in which a locating member locates a molten metal body in contact with a surface of an advancing ribbon of glass, wherein the locating member is an elongated member having a metallic surface region which is wettable by the molten body and to which the molten metal body clings in use, and the configuration of that wettable metallic surface region is at least partially demarcated by a coherent surface coating whose outer face is not wetted by the molten metal body, the inner face of said coherent surface coating, exposed by erosion of said metallic surface region of the locating member, being wettable by the molten metal body to maintain, in use, the configuration of the molten metal body.

2. Apparatus according to claim 1, wherein the wettable metallic surface region is a face of the elongated member and the non-wetted surface coating extends up to at least one edge of that face.

3. Apparatus according to claim 2, wherein said face of the member is a flat face for locating adjacent a surface of the ribbon of glass, and the non-wetted surface coating extends over a surface of the member adjacent that face up to an edge of that face.

4. Apparatus according to claim 3, wherein the transverse cross-section of the elongated locating member is of rectangular form, the member having a flat face, the lower face in use, and two longer upright faces, and the non-wetted surface coating is provided on at least one of said longer upright faces of the member.

5. Apparatus according to claim 4, wherein the non-wetted surface coating extends around said edge of the flat face of the member and just on to the flat face.

6. Apparatus according to claim 4, wherein the edge where the flat face and said one of the longer upright faces meet is bevelled, and the non-wetted surface coating extends over the face of the bevel.

7. Apparatus according to claim 4, wherein both of the longer upright faces of the member are provided with a non-wetted surface coating.

8. Apparatus according to claim 7, wherein the non-wetted surface coatings extend around both longer edges of the flat face and just on to the flat face.

9. Apparatus according to claim 7, wherein both longer edges of the flat face are bevelled, and the non-wetted surface coatings extend over the faces of both bevels.

10. Glass manufacturing apparatus of the kind in which a locating member locates a molten metal body in contact with a surface of an advancing ribbon of glass, wherein the locating member is an elongated member having a metallic surface region which is wettable by the molten metal body and to which the molten metal body clings in use, and having a coherent surface coating whose outer face is not wetted by the molten metal body and which demarcates a desired pattern on the wettable metallic surface region of the locating member to maintain, in use, a desired configuration of the molten metal body having the shape of that pattern.

11. Glass manufacturing apparatus for producing patterned glass including a locating member for locating a molten metal body in contact with a surface of an advancing ribbon of glass, wherein the locating member is an elongated member having a metallic surface region which is wettable by the molten metal body and is shaped to a desired configuration for imparting a desired pattern to the glass, said configuration including at least one re-entrant portion, and having a coherent surface coating whose outer face is not wetted by the molten body, which surface coating is provided on a face of the locating member adjoining the wettable metallic surface region at the re-entrant portion.

12. Glass manufacturing apparatus comprising means for advancing a ribbon of glass, and an elongated locating member locating a molten metal body in contact with a surface of the advancing ribbon of glass, said elongated locating member having a metallic surface region which is wetted by the molten metal body and to which the molten metal body clings in use, and a coherent surface coating whose outer face is not wetted by the molten metal body, the inner face of said surface coating demarcating the metallic surface region of said elongated locating member which is wetted by the molten metal body despite any wear of said metallic surface region by said metal body.

13. Glass manufacturing apparatus of the kind including a locating member which locates a molten metal body in contact with a surface of an advancing ribbon of glass, wherein the locating member is an elongated member having a metallic surface region which is wettable by the molten metal body and to which the molten metal body clings in use, and the configuration of that wettable surface region is demarcated by a chromium coating on the locating member, which chromium coating presents an outer chromium oxide surface which is not wetted by the molten metal body.

14. Apparatus according to claim 13, wherein the locating member is an elongated bar of a metal soluble in the molten metal body, and the longer upright faces of the bar are provided with said chromium coatings.

15. Apparatus according to claim 14, wherein the bar is an elongated copper bar of rectangular transverse cross-section whose longer upright faces are chromium-plated.

16. Glass manufacturing apparatus comprising means defining a path of travel for a glass ribbon, means for advancing the glass ribbon along that path, and an elongated locating member mounted adjacent said path of travel for locating a molten metal body on a surface of the glass ribbon, wherein the locating member has a metallic surface region facing the path of travel, which surface region is wettable by the molten metal body and to which the molten body clings in use, and the configuration of that wettable metallic surface region is at least partially demarcated by a coherent surface coating of a material whose outer face is not wetted by the molten metal body which coating, in use, maintains the configuration of the molten metal body clinging to said surface region.

17. Glass manufacturing apparatus comprising an elongated tank structure containing a bath of molten metal, means for advancing a ribbon of glass along the bath, and an elongated locating member extending across the tank structure just above the path of travel of the upper surface of the ribbon of glass for locating a molten metal body on the upper surface of the ribbon, wherein the elongated locating member has a metallic lower face which is wettable by the molten metal body, which is thereby located on the upper surface of the ribbon, and longer upright faces each provided with a coherent coating presenting an outer surface which is not wetted by the molten body which coating, in use, is effective to maintain the configuration on the upper surface of the ribbon of glass of the molten metal body clinging to said metallic lower face of the elongated locating member.

18. Apparatus according to claim 17, wherein the longer upright faces of the locating member are chromium-plated.

19. An elongated locating member for locating a molten metal body on a surface of an advancing ribbon of glass, wherein the locating member has a metallic surface region which is wettable by the molten metal body and to which the molten metal body clings in use, and a coherent surface coating of a material whose outer face, in use, is not wetted by the molten metal body, which coherent surface coating demarcates the configuration of said wettable metallic surface region and thereby, in use, maintains the configuration of the molten metal body clinging to said surface region.

20. A locating member according to claim 19, wherein the wettable metallic surface region is a face of the member and the non-wetted surface coating extends up to at least one edge of that face.

21. An elongated locating member for locating a molten metal body on the upper surface of an advancing ribbon of glass, wherein a lower metallic surface region of the locating member is wettable by the molten metal body, and the configuration of that lower surface region is demarcated, by a coherent coating of a material whose outer surface is not wetted by the molten metal body and which is applied selectively to the surface of the locating member in a manner to define a predetermined configuration of a molten metal body clinging to said wettable metallic surface region.

22. A locating member according to claim 21, wherein the member has a flat lower face and upright side faces, the lower face is of a material which is wetted by the molten metal body, and the longer side faces are both provided with a coherent coating presenting an outer surface which is not wetted by the molten body.

23. A locating member according to claim 22, which is an elongated bar whose transverse cross-section is of rectangular form and which is made of a metal soluble in the molten metal body, the longer upright side faces of the bar having coatings of chromium which present chromium oxide surfaces which are not wetted by the molten metal body.

24. A locating member according to claim 23, wherein the elongated bar is a copper bar whose longer upright side faces are chromium-plated.

25. A glass manufacturing process in which a surface of an advancing glass ribbon is treated with a molten metal body which clings to a wettable metallic surface region of an elongated locating member positioned adjacent to that ribbon surface, including at least partially demarcating the configuration of the wettable metallic surface region of the locating member by applying selectively to the locating member a coherent surface coating of material whose outer face is not wetted by the molten body.

26. Glass manufacturing apparatus comprising means for advancing a ribbon of glass, and an elongated located member locating a molten metal body in contact with a surface of the advancing ribbon of glass, said elongated locating member having a metallic surface region which is wetted by the molten metal body and to which the molten metal body clings in use, and a coherent surface coating whose outer face is not wetted by the molten metal body and whose inner face, exposed by erosion of said metallic surface region of the locating member, is wetted by the molten metal body, said coherent surface coating at least partially demarcating said metallic surface region to maintain the configuration of the molten metal body.

27. Glass manufacturing apparatus comprising means for advancing a ribbon of glass, and an elongated locating member for locating a molten metal body in contact with a surface of the advancing ribbon of glass, said elongated locating member having a metallic surface region which is wettable by the molten metal body and to which the molten metal body clings in use, and a coherent surface coating whose outer face is not wettable by the molten metal body, and whose inner face, is adapted, upon exposure by erosion of said metallic surface region of the locating member, to retain sufficient wettable metal of said metallic surface region adhered thereto to ensure that the inner face is at least partially wettable by the molten metal body, said coherent surface coating, in use, at least partially demarcating said metallic surface region to maintain the configuration of the molten metal body.

28. Glass manufacturing apparatus comprising means for advancing a ribbon of glass, and an elongated locating member locating a molten metal body in contact with a surface of the advancing ribbon of glass, said elongated locating member having a metallic surface region which is wetted by the molten metal body and to which the molten metal body clings in use, and a coherent surface coating whose outer face is not wetted by the molten metal body and whose inner face, exposed by erosion of said metallic surface region of the locating member, has sufficient wettable metal of said metallic surface region adhered thereto to ensure that the inner face is at least partially wetted by the molten metal body, said coherent surface coating at least partially demarcating said metallic surface region to maintain the configuration of the molten metal body.

* * * * *